(12) United States Patent
Kawasumi

(10) Patent No.: US 12,070,825 B2
(45) Date of Patent: Aug. 27, 2024

(54) MACHINE TOOL

(71) Applicant: STAR MICRONICS CO., LTD., Shizuoka (JP)

(72) Inventor: Masahiro Kawasumi, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 470 days.

(21) Appl. No.: 17/552,120

(22) Filed: Dec. 15, 2021

(65) Prior Publication Data
US 2022/0105599 A1   Apr. 7, 2022

Related U.S. Application Data

(63) Continuation of application No. PCT/JP2019/049507, filed on Dec. 18, 2019.

(30) Foreign Application Priority Data

Jun. 21, 2019  (JP) ................. 2019-115578

(51) Int. Cl.
*B23Q 11/08* (2006.01)
*B23B 3/06* (2006.01)
(Continued)

(52) U.S. Cl.
CPC .......... *B23Q 11/0891* (2013.01); *B23B 3/065* (2013.01); *B23Q 11/0078* (2013.01); *B23Q 11/0825* (2013.01); *Y10T 29/5109* (2015.01)

(58) Field of Classification Search
CPC ....... Y10T 409/30392; Y10T 83/95–96; Y10T 74/219–2199; B23B 25/04; B23B 7/10;
(Continued)

(56) References Cited

U.S. PATENT DOCUMENTS

| | | | |
|---|---|---|---|
| 2,208,311 A * | 7/1940 | Lucas | B23Q 1/0009 408/111 |
| 6,585,564 B1 | 7/2003 | Hiramoto et al. | |
| 2008/0196309 A1* | 8/2008 | Thibaut | B23Q 11/0891 49/37 |

FOREIGN PATENT DOCUMENTS

| | | |
|---|---|---|
| CN | 201693371 U | 1/2011 |
| CN | 104816195 A * | 8/2015 |

(Continued)

OTHER PUBLICATIONS

Taiwanese search report of the office action in application No. TW109118586 dated Dec. 12, 2023 and its English translation; pp. 1-16.

*Primary Examiner* — Erica E Cadugan
(74) *Attorney, Agent, or Firm* — MUNCY GEISSLER OLDS & LOWE P.C.

(57) ABSTRACT

A machine tool capable of restraining dirt on the footstool and improving setup efficiency. The machine tool includes a machine body having a splash guard surrounding a machining area and a door capable of closing an opening of the splash guard. A footstool is kept mounted on the machine body changeably in place with respect to the machine body. The footstool kept mounted on the machine body is capable of being in a place on an outside of the machine body when the door is closed. The footstool kept mounted on the machine body is capable of being brought to a setup place inside the machining area from the outside of the machine body through the opening when the door is open.

20 Claims, 8 Drawing Sheets

(51) Int. Cl.
*B23B 25/04* (2006.01)
*B23Q 11/00* (2006.01)

(58) Field of Classification Search
CPC . B23Q 11/08–11/0891; B23Q 11/0078; B24B 55/04–55/045; B23K 26/12; B23K 26/127–128; B25H 5/00
USPC .................. 100/349; 409/134; 451/451–457; 83/859–860; 74/608–617
See application file for complete search history.

(56) References Cited

FOREIGN PATENT DOCUMENTS

| | | | |
|---|---|---|---|
| CN | 205218802 U | * | 5/2016 |
| CN | 206662719 U | | 11/2017 |
| CN | 109128986 A | * | 1/2019 |
| CN | 213289085 U | * | 5/2021 |
| JP | H04-164579 A | | 6/1992 |
| JP | H 6-37442 Y | | 9/1994 |
| JP | 2830450 B2 | | 12/1998 |
| JP | 2003251578 A | | 9/2003 |
| JP | 2015013335 A | | 1/2015 |
| JP | 2017144513 A | | 8/2017 |
| KR | 10-2237615 B1 | * | 4/2021 |
| KR | 10-2023-0139543 A | * | 10/2023 |
| TW | 201416163 A | | 5/2014 |
| WO | WO0136150 A1 | | 5/2001 |
| WO | WO-2020255455 A1 | * | 12/2020 |

* cited by examiner

MACHINE TOOL

CROSS-REFERENCE TO RELATED APPLICATION

The present application is a continuation of PCT Application No. PCT/JP2019/049507, filed on Dec. 18, 2019, which claims priority of Japanese Patent Application No. 2019-115578 filed on Jun. 21, 2019. The contents of this application are incorporated herein by reference in their entirety.

BACKGROUND

(a) Field

The present invention relates to a machine tool provided with a footstool for use in a setup.

(b) Description of the Related Art

During a setup in a large lathe, it is well known that an operator uses a footstool in a machining area to attach or detach a unit or discharge a workpiece chip. The footstool is generally placed near an opening of a splash guard in the machining area. A machine tool as disclosed in Japanese Patent Application Publication No. 2015-13335 is provided with a footstool changeable between a machining posture and a setup posture. Whichever posture the footstool takes, the footstool is placed in the machining area inside the opening of the splash guard and near the opening thereof.

SUMMARY

The footstool placed in the machining area is exposed to lubricant and a workpiece chip. If the operator steps on such dirty footstool, lubricant and a workpiece chip attached to a sole of a shoe makes the floor dirty. Cleaning the footstool is required to keep the factory clean. Further, it is bothersome for the operator to carry the footstool from the outside of the machine into the machining area before a setup and then carry the footstool to the outside of the machine after the setup.

The present invention discloses a machine tool capable of restraining dirt on the footstool and improving setup efficiency.

The machine tool of the invention includes a machine body having a splash guard surrounding a machining area and a door capable of closing an opening of the splash guard. A footstool is kept mounted on the machine body changeably in place with respect to the machine body. The footstool kept mounted on the machine body is capable of being in a place on an outside of the machine body when the door is closed. The footstool kept mounted on the machine body is capable of being brought to a setup place inside the machining area from the outside of the machine body through the opening when the door is open.

The invention provides a machine tool capable of restraining dirt on the footstool and improving setup efficiency.

DETAILED DESCRIPTION

Figure 1:
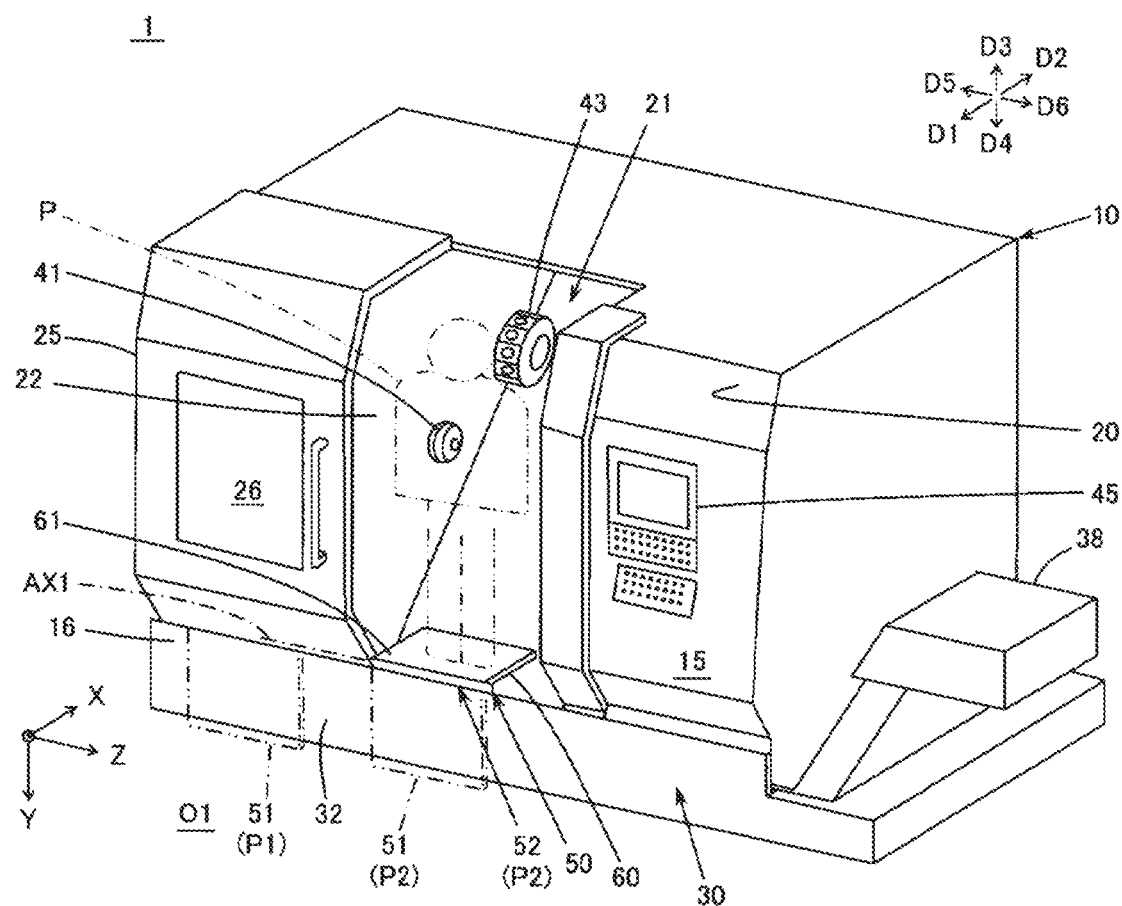
FIG. 1 is a perspective view schematically showing a machine tool.

Hereinafter, an embodiment of the present invention will be described. The invention is not limited to the exemplary embodiment and the features disclosed herein are not necessarily essential to the invention.

(1) TECHNOLOGY INCLUDED IN THE INVENTION

Technology of the invention will be described with reference to FIG. 1 to FIG. 8. The drawings only schematically show an example of the invention. They may have a mismatch to each other due to different magnification in each direction. Each element denoted by a symbol is only an example.

Embodiment 1

A machine tool (a lathe 1, for example) of an embodiment of the technology may include a machine body 10 and a footstool 50. The machine body 10 may include a splash guard 20 surrounding a machining area 21 and a door 25 capable of closing an opening 22 of the splash guard 20. The footstool 50 may be kept mounted on the machine body 10 changeably in place with respect to the machine body 10. The footstool 50 kept mounted on the machine body 10 may be capable of being in a place on the outside O1 of the machine body 10 when the door 25 is closed. The footstool 50 kept mounted on the machine body 10 may be capable of being brought to a setup place 52 inside the machining area 21 from the outside O1 of the machine body 10 through the opening 22 when the door 25 is open.

The footstool 50 kept mounted on the machine body 10 may be held in the place on the outside O1 of the machine body during a machining with the door 25 closed. The footstool 50 placed as such can be protected from oil and a workpiece chip and safety can be maintained. The footstool 50 kept mounted on the machine body 10 may be brought to the setup place 52 inside the machining area 21 from the place on the outside O1 of the machine body 10 through the opening 22 with the door 25 open. The operator P can readily shift the footstool 50 to the setup place 52 from the standby place on the outside O1 of the machine body. The embodiment provides a machine tool capable of protecting the footstool from dirt and also improving setup efficiency. Further, the footstool 50 held in the setup place 52 crossing the opening 22 may serve as an interlocking device for the door 25. The embodiment secures safety of the operator during a setup.

Embodiment 2

Figure 4:
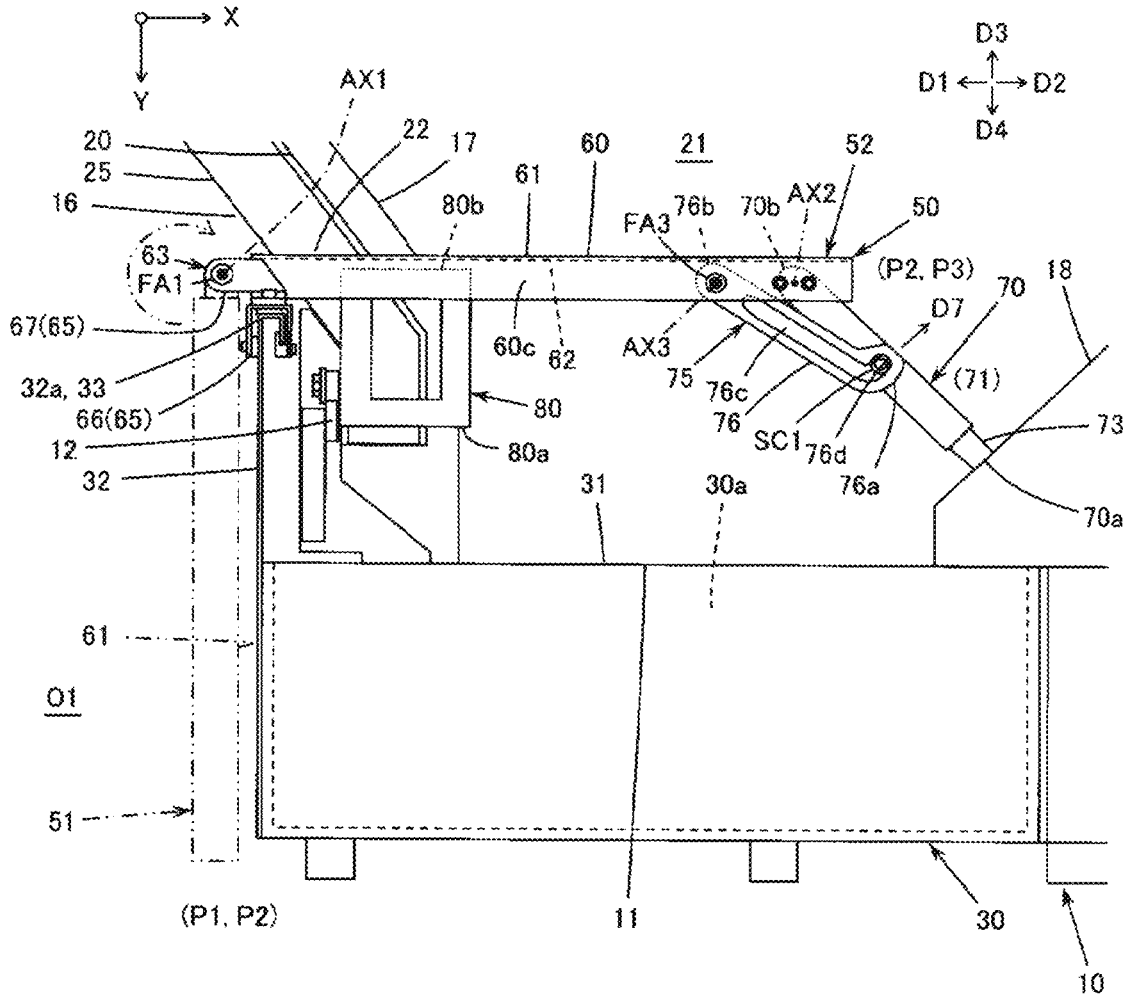
FIG. 4 schematically shows primary part of the machine tool with the footstool held in a setup place.

As shown in FIG. 4 and others, the footstool 50 may have a footboard surface 61 on which the operator P can step when the footstool 50 is held in the setup place 52. The footboard surface 61 may have different orientations between the setup place 52 and a storage place 51, which is the standby place on the outside O1 of the machine body 10 when the door 25 is closed. The operator P can thereby step on the footboard surface 61 of the footstool 50 to perform a setup when the footstool 50 is held in the setup place 52. The footboard surface 61 may be differently oriented when the footstool 50 is in the storage place 51. The embodiment thereby provides improved storage performance of the footstool.

Figure 8:
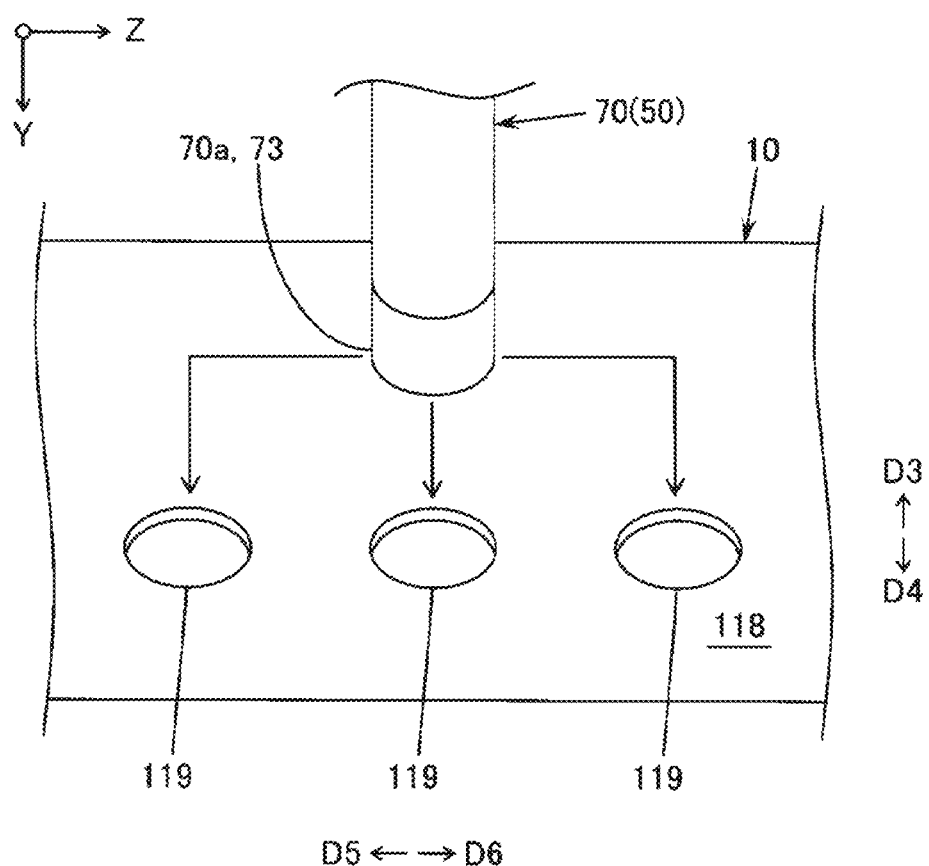
FIG. 8 schematically shows a positioning structure of the footstool.

A footboard surface orientating mechanism may include a footboard turning mechanism, a footboard sliding and turning mechanism (FIG. 6), and a footboard guiding mechanism having a curve (not shown). This remark may be applied to the embodiments as described below. Orientation of the footboard surface 61 may be the same even when the footstool 50 is shifted to the setup place as shown in FIG. 8. Such embodiment may be also included in the scope of the technology.

Embodiment 3

Figure 2A:
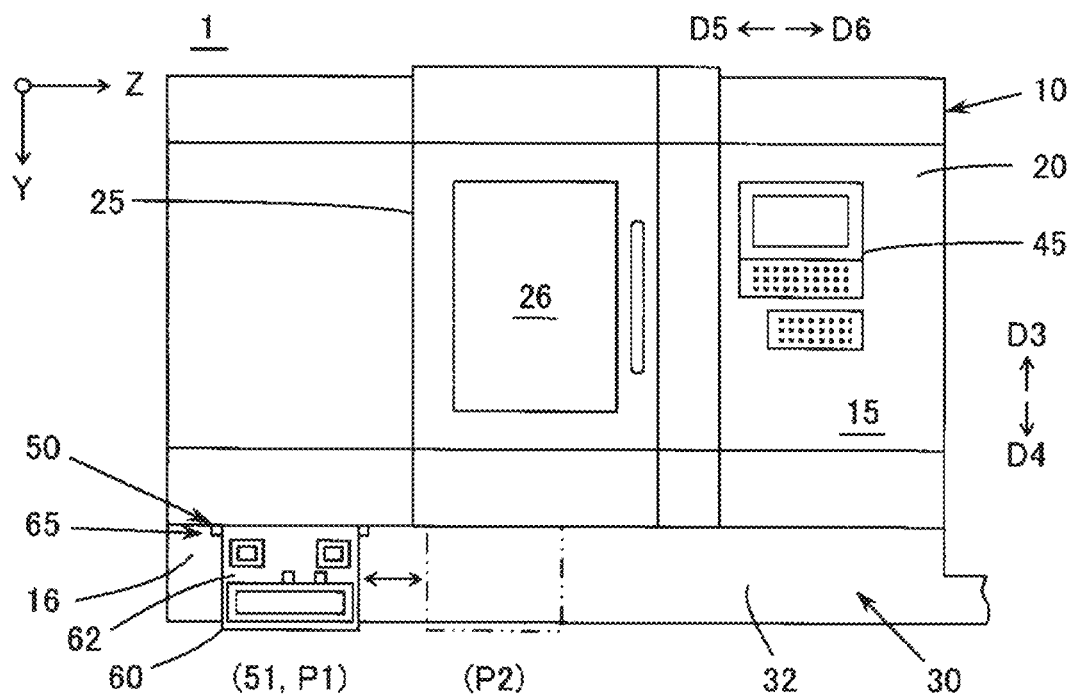
FIG. 2A is a front view schematically showing the machine tool during a machining.

As shown in FIG. 2A and others, the storage place 51 of the footstool 50 may have changeable horizontal positions (horizontal positions P1 and P2, for example). The operator P can switch the storage place 51 between the horizontal positions P1 and P2 during the machining with the door 25 closed. The embodiment allows the operator to shift the footstool to a horizontal position not disturbing the operator's performance.

The horizontal position of the footstool may mean a position of a horizontal component of the footstool. The horizontal position may be a position along the exact horizontal direction or along any direction deviated upwards or downwards as far as the direction has a horizontal component. This remark may be applied to the embodiments as described below. Alternatively, the footstool held in the storage place may be horizontally fixed. Such embodiment may be also included in the scope of the technology.

Embodiment 4

Figure 2B:
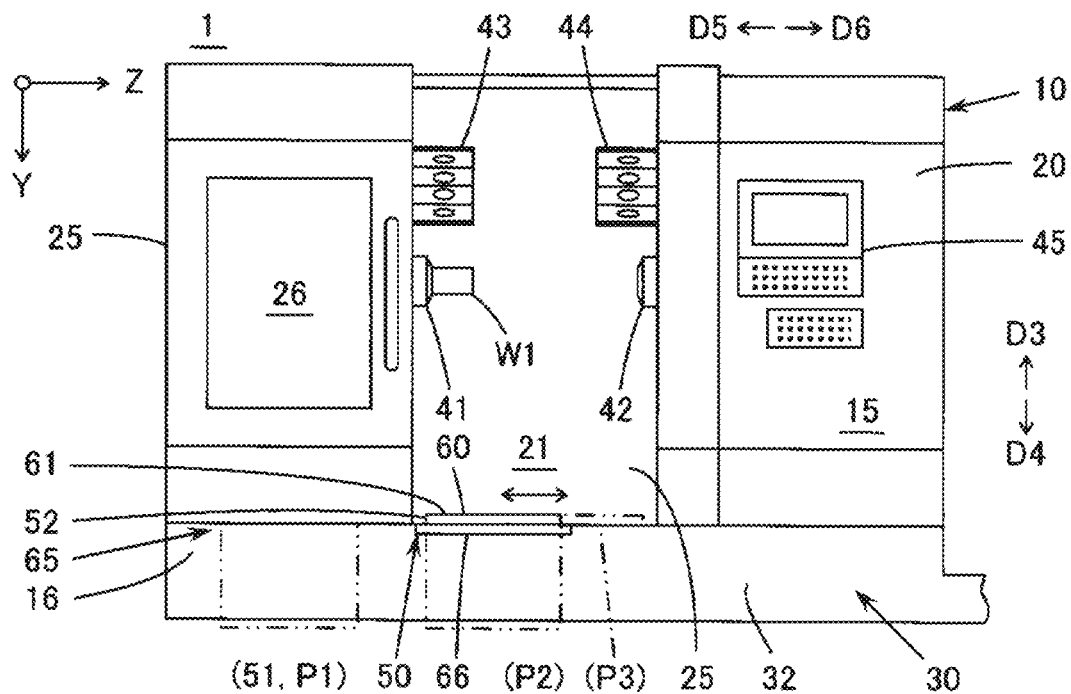
FIG. 2B is a front view schematically showing the machine tool during a setup.

As shown in FIG. 2B and others, the setup place 52 of the footstool 50 may have changeable horizontal positions (horizontal positions P2 and P3, for example). The operator P can change the horizontal position of the footstool 50 brought inside the machining area 21 from the place on the outside O1 of the machine body 10 through the opening 22 when the door 25 is open. The machine tool 1 may include a first spindle and an opposite second spindle. The operator P may shift the footstool 50 to a horizontal position near the first spindle to set up the first spindle and to another horizontal position near the second spindle to set up the second spindle. The embodiment further provides improved setup efficiency. Alternatively, the hootstool held in the setup place may be horizontally fixed. Such embodiment may be also included in the scope of the technology.

Embodiment 5

Figure 5:
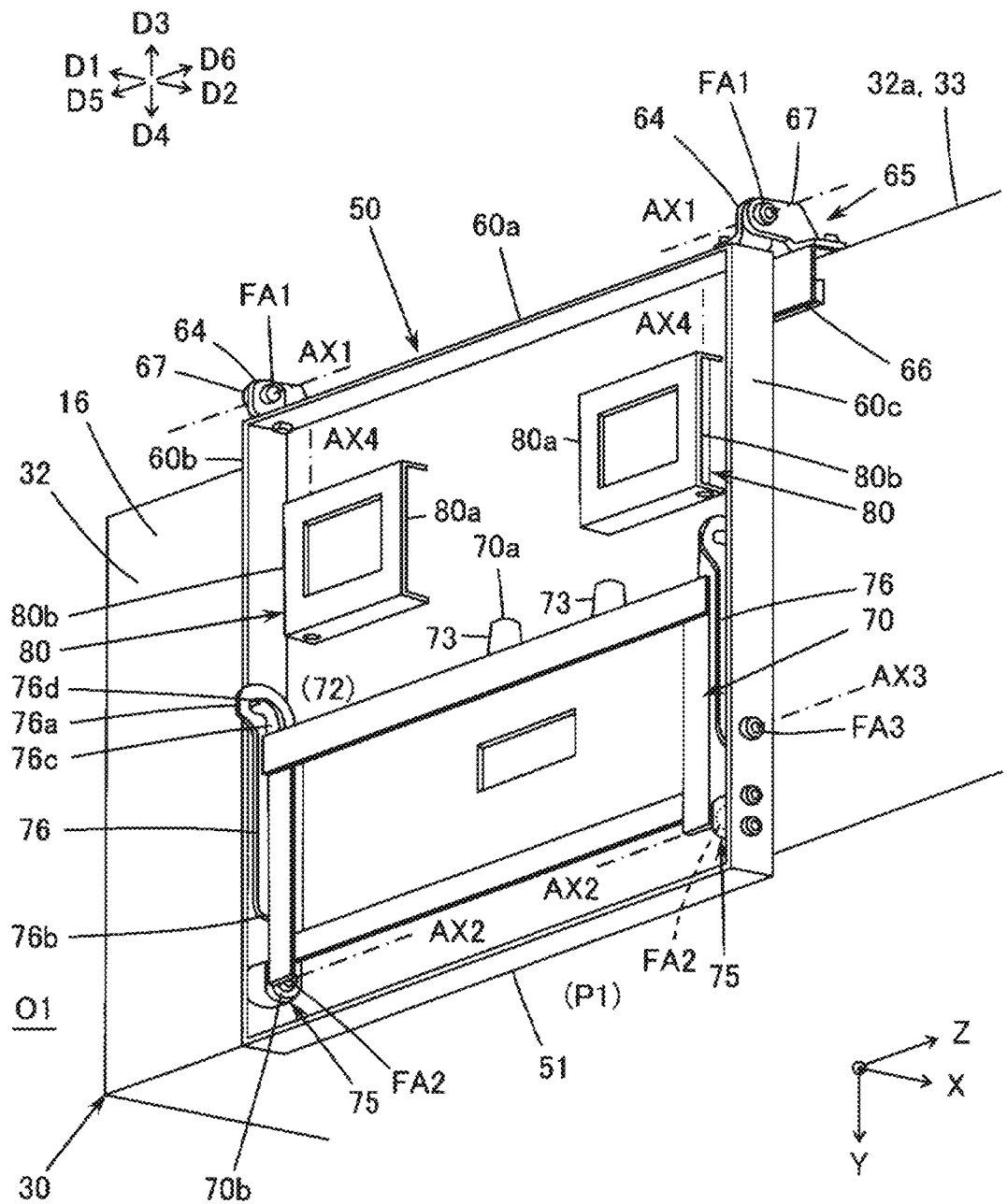
FIG. 5 is a perspective view schematically showing the footstool held in the storage place.

As shown in FIG. 4, FIG. 5, and others, the footstool 50 may include a footboard 60, a leg 70, and a tilt mechanism 75. The footboard 60 may be mounted on the machine body 10 changeably in place with respect to the machine body 10. The leg 70 may support the footboard 60 on which the operator steps when the footstool 50 is held in the setup place 52. The tilt mechanism 75 may tilt the leg 70 with respect to the footboard 60. The leg 70 may be switched between a use state 71 and a non-use state 72. In the use state 71, the leg 70 may support the footboard 60. In the non-use state 72, the leg 70 may be angled along the footboard 60. The machine body 10 may be provided with a rest (a rear slope 18, for example) receiving an end 70a of the leg 70 when the footstool 50 is held in the setup place 52 and the leg 70 is held in the use state 71. The footboard 60 in the setup place 52 may be thereby supported by the leg 70 in the use state 71 on the rest of the machine body 10. The embodiment thereby improves durability of the footstool 50. The leg 70 may be angled in a non-disturbing position along the footboard 60 when the footstool 50 is held in the storage place. The embodiment thereby provides improved storage performance of the footstool. The footstool having the footboard, the leg, and the tilt mechanism may be only an example of the technology.

Embodiment 6

As shown in FIG. 1 and others, the machine body 10 may have a retreat 16 provided on a lower part of an outside surface 15 having the door 25. The retreat 16 may receive the footstool 50 brought to the storage place 51 with the door 25 closed. The embodiment eliminates the need for a special space for storage since the footstool 50 can be stored in the retreat 16 provided on the lower part of the machine body 10. Alternatively, the machine body may not have such retreat within the scope of the technology.

(2) CONFIGURATION OF THE MACHINE TOOL

Figure 3:
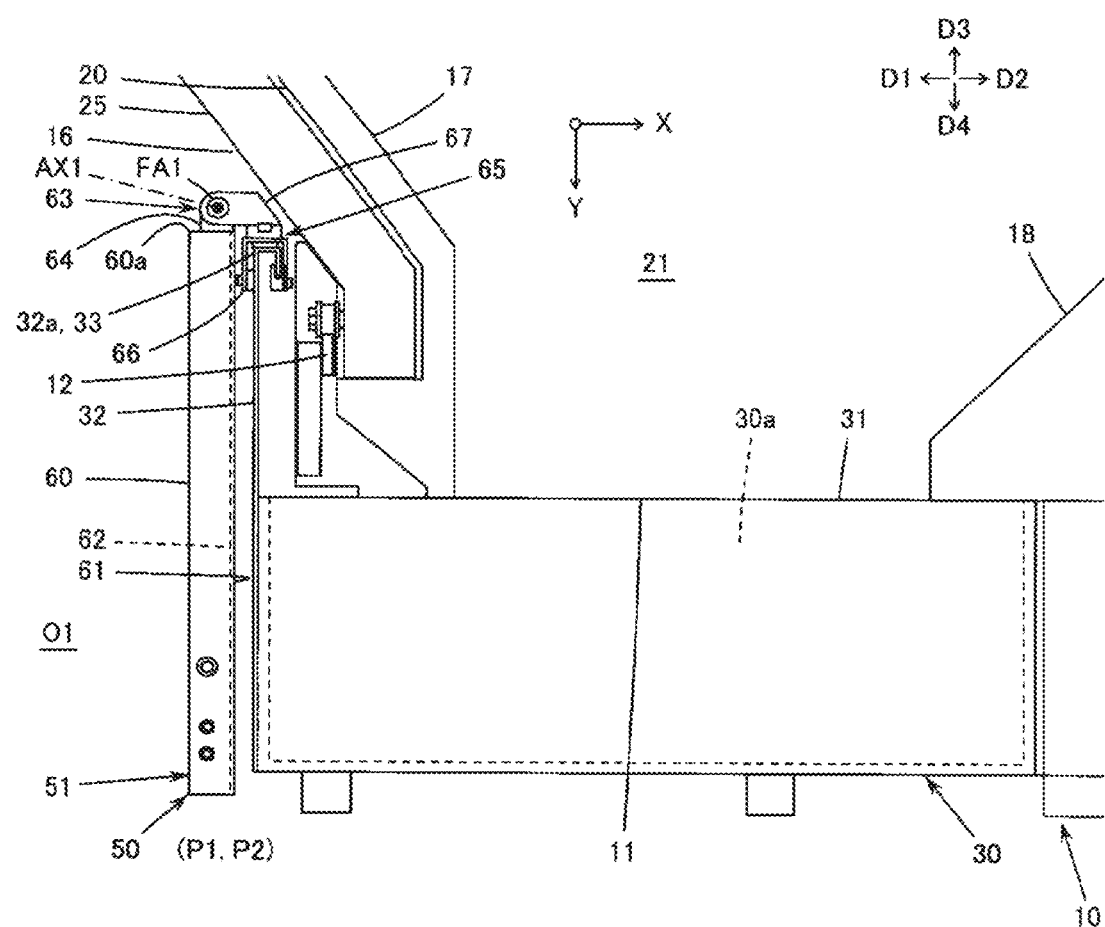
FIG. 3 schematically shows primary part of the machine tool with the footstool held in a storage place.

FIG. 1 schematically shows a configuration of an NC (numerically controlled) lathe 1 of spindle stationary type as an example of the machine tool. The lathe 1 may be provided with the footstool 50 that the operator P uses in the machining area 21 during a setup. FIG. 2A schematically shows a front view of the lathe 1 during a machining. FIG. 2B schematically shows a front view of the lathe 1 during the setup. FIG. 3 schematically shows primary part of the lathe 1 with the footstool 50 held in the storage place 51. FIG. 4 schematically shows primary part of the lathe 1 with the footstool 50 held in the setup place 52. FIG. 5 schematically shows an appearance of the footstool 50 held in the storage place 51. The illustration is only a simplified example for explanation of the invention. The invention is not limited thereto. A positional relation between elements is only an example for explanation. The left and right direction may be replaced by the up and down direction or the front and back direction. The up and down direction may be replaced by the left and right direction or the front and back direction. The front and back direction may be replaced by the left and right direction or the up and down direction. The rotational direction may be inversed. If something is the same as something in direction or position, they may be the same or almost the same within an error range.

The lathe 1 as shown in FIG. 1, FIG. 2B and others may include the machine body 10 and the footstool 50. The machine body 10 may include spindles 41 and 42, tool posts 43 and 44, an operation panel 45, and a not-shown NC apparatus. The footstool 50 may be kept mounted on the machine body 10 changeably in place with respect to the machine body 10. The front spindle 41 and the back spindle 42 may be opposite each other with respect to a Z-axis direction, which is a right-left direction in FIG. 2B. The spindles 41 and 42 may hold a workpiece W1. The front spindle 41 may not move in the Z-axis direction in the lathe of spindle-stationary-type. The back spindle 42 may move in the Z-axis direction toward the front spindle 41 to receive the workpiece W1 whose front side has been machined. The tool posts 43 and 44 may include a turret tool post (FIG. 2B) and a gang tool post. The tool post may hold a tool for use in machining the workpiece W1. The tool may include a turning tool including a cut-off tool and a rotary tool such as a drill and an end mill. The operation panel 45 may include a display and a button to receive an input by the operator. The NC apparatus may execute an NC program stored in a not-shown nonvoratile semiconductor memory. Only for convenience, a horizontal direction perpendicular to the Z-axis direction may be called an X-axis direction and a vertical direction perpendicular to the Z-axis direction may be called a Y-axis direction. The drawings show "X" representing the X-axis direction, "Y" representing the Y-axis direction, and "Z" representing the Z-axis direction. The drawings show a front direction D1, a rear direction D2, an upper direction D3, a lower direction D4, a left direction D5, and a right direction D6 when the outside surface having the door 25 is assumed to be a surface on the front side. Unless otherwise specified, positional relations in the lathe 1 are being described by using the directions D1 to D6. A description of positional relation including a left-right and an upper-lower directions is being accompanied by a reference to a relevant drawing number.

The spindles 41 and 42 and the tool posts 43 and 44 may be arranged in the machining area 21. The machining area 21 may be surrounded by the splash guard 20 having the opening 22. The machine body 10 may be provided with the door 25 to open and close the opening 22 provided on the front side of the splash guard 20. The splash guard 20 and the door 25 can cooperatively isolate the machining area 21 from the operator during the machining. The splash guard 20 and the door 25 can cooperatively ensure safety of the operator and hinder the scattering of a workpiece chip and coolant on the outside O1 of the lathe 1. The opening 22 of the splash guard 20 may be provided around the middle of the left-and-right width of the machine body 10. The door 25 may be a slide door movable in the Z-axis direction between a closed position closing the opening 22 as shown in FIG. 2A and an open position opening the opening 22 as shown in FIG. 2B. The machine body 10 may be provided with a door rail 12 longitudinally extended in the Z-axis direction as shown in FIG. 3. The door 25 may slide on the door rail 12 in the Z-axis direction. The door 25 may have a transparent window 26 through which the operator can see the machining area 21 during the machining.

A coolant tank 30 may be provided at the lower portion of the machine body 10. The coolant tank 30 may have an inside 30*a* where the workpiece chip and coolant are accumulated. As shown in FIG. 3, the machine body 10 may have a downward opening 11 and the coolant tank 30 may have an upward opening 31 matching with the downward opening 11. The machining area 21 may be divided by a front slope 17 and a rear slope 18 provided near the bottom of the machining area 21. The front slope 17 may be arranged on the front side of the machining area 21. A surface of the front slope 17 may become lower toward the rear. The rear slope 18 may be arranged on the rear side of the machining area 21. A surface of the rear slope 18 may become lower toward the front. Any workpiece chip and coolant adhered to the front slope 17 and the rear slope 18 may be guided toward the downward opening 11 to be dropped into the inside 30*a* of the coolant tank 30 through the upward opening 31. The chip and coolant stored in the inside 30*a* may be discharged to the outside O1 of the machine body 10 by a chip conveyor 38 as shown in FIG. 1. The chip and coolant may be guided along the slopes in a lathe provided with a slant structure such as the front slope 17 and the rear slope 18. In the embodiment of the invention, the footstool 50 may be placed in the machining area 21 to prevent the operator's shoes from becoming dirty by the chips and coolant. A rail 33 may be provided on an upper edge 32*a* of a front plate 32 of the coolant tank 30. The footstool 50 may slide on the rail 33 in the Z-axis direction on the outside O1 of the machine body 10. The rail 33 may be arranged outside the door rail 12.

The machine body 10 may have the retreat 16 or a cave formed on a lower side of the outside surface 15 having the door 25. The footstool 50 kept mounted on the machine body 10 may be stored in the retreat 16 when brought to the storage place 51 outside the machining area 21.

As shown in FIG. 4 and FIG. 5, the footstool 50 may include a footboard 60, a turning mechanism 63 of the footboard 60, a guide structure 65 in the Z-axis direction, the leg 70, the tilt mechanism 75 of the leg 70, and a pair of auxiliary legs 80. The footboard 60 may be kept mounted on the machine body 10 changeably in place with respect to the machine body 10. The footboard 60 may have the footboard surface 61 on which the operator P can step when the footstool 50 is held in the setup place 52. Orientation of the footboard surface 61 may be approximately horizontal in the setup place 52. Orientation of the footboard surface 61 may be approximately vertical in the storage place 51. The leg 70, the tilt mechanism 75, and the auxiliary legs 80 may be attached to a back surface 62 of the footboard 60.

The turning mechanism 63 of the footboard 60 may include a pair of brackets 64 attached to a base end 60*a* of the footboard 60. The turning mechanism 63 may further include a pair of fasteners FA1. The base end 60*a* may be extended along a turning axis AX1. The base end 60*a* may be an edge closest to the turning axis AX1. Each of the brackets 64 may be fastened to each side end of the longitudinal base end 60*a* with a screw. The fastener FA1 may include a combination of a bolt and a nut. The fastener FA1 may relatively turnably fasten the bracket 64 to a bracket 67 of a guide structure 65. The turning mechanism 63 may allow the footboard 60 to turn around the turning axis AX1 passing through the pair of fasteners FA1. The footboard 60 may have side ends 60*b* and 60*c* perpendicular to the base end 60*a*. A base end 70*b* of the leg 70 may be attached to the side ends 60*b* and 60*c* with a pair of fasteners FA2. The base end 70*b* of the leg 70 may tilt around a tilt axis AX2. A base end 76*b* of a leg stopper 76 may be attached to the side ends 60*b* and 60*c* with a pair of fasteners FA3. The base end 76*b* of the leg 70 may be turnable around a turning axis AX3. The fasteners FA2 and FA3 respectively may be made of a combination of a bolt and a nut.

The guide structure 65 may include a guide 66 and the pair of brackets 67 attached to the guide 66. The guide 66 may be slidably engaged with the rail 33 of the coolant tank 30. Each of the brackets 67 may be fastened to each side end of an upper surface of the guide 66 with a screw. The guide 66 may be longitudinally extended along the turning axis AX1. The footboard 60 may be fastened to the bracket 64 and further to the bracket 67 attached to the guide 66 via the fastener FA1. The footstool 50 provided with the turnable footboard 60 may be slidable on the rail 33 in the Z-axis direction.

The leg 70 can support the footboard 60 when the footstool 50 is held in the setup place 52 as shown in FIG. 4. The base end 70*b* of the leg 70 may be attached to the side ends 60b and 60c of the footboard 60 in a tiltable manner around the tilt axis AX2. The leg 70 may be thereby tiltable with respect to the footboard 60. A distal end 70a of the leg 70 may have a slip stopper 73. When the footstool 50 is held in the setup place 52 and the leg 70 is pulled from the back surface 62 of the footboard 60 to be in a use state 71 as shown in FIG. 4, the slip stopper 73 may rest on the rear slope 18 of the machine body 10. The rear slope 18 may be an example of the rest. The slip stopper 73 may be made of rubber, elastomer or another. A screw SC1 passing through a slit 76c of the leg stopper 76 may be fastened to the leg 70 in a middle position between the base end 70b and the distal end 70a of the leg 70.

The tilt mechanism 75 of the leg 70 may include the pair of leg stoppers 76, the fastener FA3 provided at the base end 76b of each stopper 76, and the screw SC1 passing through the slit 76c of each stopper 76. The leg stopper 76 may have the slit 76c extended along a longitudinal direction thereof. A distal end 76a of the leg stopper 76 may bend toward a direction deviated from the longitudinal direction of the leg stopper 76. There may be a lock part 76d at an end of the slit 76c. The lock part 76d may bend toward a direction D7 deviated from the longitudinal direction of the leg stopper 76. The screw SC1 may enter the lock part 76d to keep the leg 70 in the use state 71. As described above, the base end 76b of the leg stopper 76 may be turnably attached to the side ends 60b and 60c of the footboard 60 with the fastener FA3. The base end 76b may be turnable around the turning axis AX3. Further, the screw SC1 passing through the slit 76c may be fastened in the middle position of the leg 70. The tilt mechanism 75 may then tilt the leg 70 with respect to the footboard 60 around the tilt axis AX2. The tilt mechanism 75 may allow the leg 70 to switch between the use state 71 and the non-use state 72. In the use state 71, the leg 70 may support the footboard 60 as shown in FIG. 4. In the non-use state 72, the leg 70 may be angled along the footboard 60. The direction D7 that the lock part 76d faces may match with a direction of load applied to the screw SC1 when the operator P steps on the footboard surface 61. The direction D7 is a favorable direction preventing the screw SC1 from coming off the lock part 76d when the operator P steps on the footboard surface 61.

The pair of auxiliary legs 80 may be turnably attached to the back surface 62 of the footboard 60. The auxiliary leg 80 may be turnable around the tilt axis AX4 extended along each of the side ends 60b and 60c of the footboard 60. The tilt axis AX4 may be along the base end 80b of the leg 80. In the non-use state as shown in FIG. 5, the pair of auxiliary legs 80 may be angled along the footboard 60 with distal ends 80a facing each other. When the auxiliary leg 80 is turned with respect to the back surface 62 of the footboard 60 as shown in FIG. 4, a front part (a left end in FIG. 4) of the auxiliary leg 80 may abut the door rail 12 of the machine body 10. The pair of auxiliary legs can prevent undesired forward movement of the footboard 60 when the operator steps on the footboard surface 61 supported by the angled leg 70 rested on the rear slope 18.

(3) USE STATE AND NON-USE STATE OF FOOTSTOOL

The use state and the non-use state of the footstool 50 is being explained. During machining the workpiece W1, the door 25 may be closed and the footstool 50 kept mounted on the machine body 10 may be held in the storage place 51 and brought in the horizontal position P1 as shown in FIG. 2A. The footstool 50 held in the storage place 51 may be slidable on the rail 33 in the Z-axis direction as shown in FIG. 3. Even when the door 25 is closed, the operator P can readily slide the footstool 50 held in the storage place 51 in the Z-axis direction passing the horizontal positions P1 and P2. The operator P sometimes tries a test machining as he watches the machining area 21 through the window 26 of the closed door 25. If the footstool 50 is brought to the horizontal position P2 just below the door 25, the footstool 50 would get in the operator's way. If the footstool 50 is brought to the horizontal position P1, the operator P can insert his toes just below the door 25 to approach the machining area 21 through the window. The footstool 50 on the outside O1 of the machine body 10 does not get in the operator's way, which improves work efficiency of the operator performing a test machining. Especially, if the retreat 16 is provided just below the door 25 on the front side of the machine body 10, the operator P can insert his toes into the recess 16 to readily approach the machining area 21. The lathe 1 of the invention provides improved work efficiency by moving the footstool 50 held in the storage place 51 to a non-disturbing horizontal position. The lathe 1 may be provided with a recess for accepting the operators's toes at the retreat 16 just below the door 25. The operator P can further approach the machining area 21 by inserting his toes into the recess.

First, the operator may open the door 25 to start the setup as shown in FIG. 2B. When the opening 22 of the splash guard 20 is open, the operator P may move the footstool 50 held in the storage place 51 from the horizontal position P1 to a position just below the opening 22. The footstool 50 may be thereby brought to the horizontal position P2 in the Z-axis direction. Then, the operator P may turn the footboard 60 clockwise around the turning axis AX1 by approximately 270 degrees as shown in FIG. 4. The footboard surface 61 of the footstool 50 that has been approximately vertically oriented may then become approximately horizontally oriented with the surface 61 facing upward. As described above, the footstool 50 kept mounted on the machine body 10 and held in the storage place 51 on the outside O1 of the machine body 10 may be brought to the setup place 52 in the machining area 21 through the opening 22 when the door 25 is open. The footboard 60 held in the setup place 52 may cross the opening 22 and therefore serve as an interlocking device for the door 25. The embodiment provides a lathe capable of ensuring safety of the operator during the setup.

Stepping on the footboard surface 61 of the footboard 60 would give strong stress to the turning mechanism 63 without a support by the leg 70 on the back surface 62. The operator P may pull the leg 70 in the non-use state 72 from the back surface 62 of the footboard 60 of the footstool 50 held in the storage place 51. The operator P may then tilt the leg 70 into the use state 71 as shown in FIG. 4. The operator P may further pull the auxiliary leg 80 in the non-use state from the back surface 62 and then tilt the leg 80 into the use state as shown in FIG. 4. The leg 70 may be held in the use state 71 with the screw SC1 engaged in the lock part 76d. The distal end 70a of the leg 70 may be thereby rested on the rear slope 18. The footboard 60 may be thereby supported by the leg 70. Forward movement of the footboard 60 may be thereby prevented by the auxiliary leg 80. The footstool 50 supported by both the turning mechanism 63 and the leg 70 can be improved in durability. The footboard 60 may be made thinner and the footstool 50 may be thereby reduced in weight.

The operator P can step on the footboard surface 61 of the footstool 50 held in the setup place 52 as shown in FIG. 1 to perform a setup in the machining area 21. The setup may include attaching or detaching a unit and discharging workpiece chips. The footstool 50 can be protected from lubricant and chips since it is stored on the outside O1 of the machine body 10 during a machining. The footboard surface 61 can be kept clean and therefore the operator's shoes can be kept clean even when he steps on the footboard surface 61 during the setup. The floor around the machine body 10 can be kept clean and safety is thereby improved.

If the opening 22 is larger in width compared to the footboard 60 as seen from the front, the operator P may readily slide the footstool 50 held in the setup place 52 on the rail 33 as shown in FIG. 3 in the Z-axis direction as far as the footboard 60 does not interfere with the splash guard 20 and the door 25. Referring to FIG. 2B, the operator P may bring the footstool 50 held in the setup place 52 to the horizontal position P2 on the relatively left side to readily approach the front spindle 41 and the tool post 43. Such positioning is desirable for an operation around the front spindle 41 and the tool post 43. The operator P may bring the footstool 50 held in the setup place 52 to the horizontal position P3 on the relatively right side to readily approach the back spindle 42 and the tool post 44. Such positioning is desirable for an operation around the back spindle 42 and the tool post 44. Changing the position of the footstool 50 held in the setup place 52 within a range of the width of the opening 22 improves setup efficiency. The rail 33 and the guide structure 65 may be provided outside the machining area to prevent entry of workpiece chips therebetween, which ensures smooth movement of the footstool 50 in the Z-axis direction and further facilitates maintenance of the rail 33 and the guide structure 65.

Upon completion of the setup, the operator P may turn the footboard 60 counter-clockwise around the turning axis AX1 by approximately 270 degrees as shown in FIG. 4. The footboard surface 61 of the footstool 50 that has been approximately horizontally oriented may then become approximately vertically oriented with the surface 61 facing backward. The operator P may angle the leg 70 and the auxiliary leg 80 in non-disturbing positions along the footboard 60. Then the operator may close the door 25 (FIG. 2A). As described above, the operator P can readily retract the footstool 50 from the machining area 21. The footstool 50 can save space with respect to the X-axis direction since the footboard 60 has become approximately vertically oriented. The footstool 50 can further save space with respect to the X-axis direction by angling the leg 70 and the auxiliary legs 80 to the non-disturbing positions. The footstool 50 in the storage place 51 may be stored in the retreat 16 provided on the lower front of the machine body 10. That eliminates a need for a storage space for the footstool.

The footstool 50 kept mounted on the machine body 10 can be placed on the outside O1 of the machine body 10 during machining without undesired adhesion of lubricant and workpiece chips. If the footstool is not kept mounted on the machine body, it is necessary for the operator to carry a remotely-stored footstool into the machining area before a setup and then carry the footstool back to a remote place after the setup. The footstool 50 of the lathe 1 of the invention may be kept mounted on the machine body even during machining. The footstool 50 may be changeable in place with respect to the machine body 10. Before a setup, the operator can bring the footstool 50 kept mounted on the machine body 10 and held on the outside O1 of the machine body 10 to the setup place 52 in the machining area 21 through the opening 22 when the door 25 is open. The footstool 50 in the standby place on the outside O1 of the machine body can be readily switched to the setup place in the machining area. The invention restrains dirt on the footstool and improves setup efficiency. The operator can safely approach the spindle and the tool post. After the setup, the operator can readily bring the footstool 50 kept mounted on the machine body to the outside O1 of the machine body 10 for storage.

(4) MODIFIED EMBODIMENTS

The invention may be embodied in various modified examples. The machine tool may include a lathe whose front spindle is movable in the Z-axis direction. The machine tool may include any machine tool but a lathe. The rail 33 on which the footstool 50 slides in the Z-axis direction may be provided on a housing or anywhere of the machine body. The leg 70 in the use state may not be angled or may be approximately vertical as far as the rest for the distal end of the leg is provided.

Figure 6:
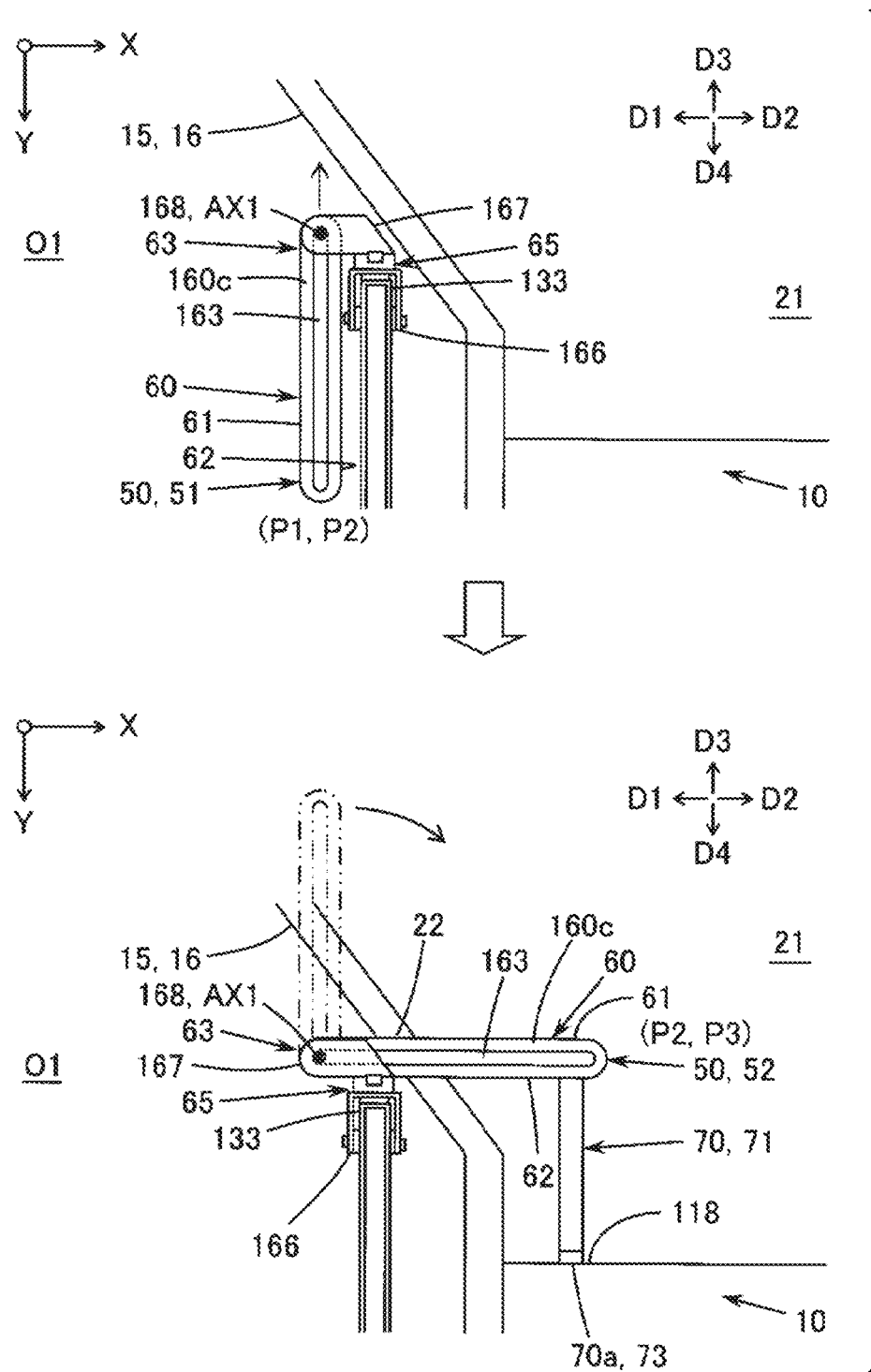
FIG. 6 schematically shows a modified example of the footstool.

Switching the footstool between the storage place and the setup place may not be limited to the example mentioned above. For example, orientation of the footboard surface 61 in the storage place may be deviated from the approximately vertical direction. FIG. 6 schematically shows a modified embodiment of the footstool 50. The upper drawing shows the storage place 51 while the lower drawing shows the setup place 52. Similar elements are not being described in detail but with the same referential numbers.

The machine body 10 in FIG. 6 may be provided with a rail 133 on the outside O1 of the machine body 10. The footstool 50 may slide on the rail 133 in the Z-axis direction. The footstool 50 may be provided with the guide structure 65 having a guide 166 and a bracket 167. The guide 166 may be engaged with the rail 133 in a slidable manner in the Z-axis direction. The bracket 167 may have a support shaft 168 to be received in a long groove 163 provided on a side end 160c of the footboard 60. A not-shown bracket having another support shaft to be received in another long groove provided on an opposite side end 160c of the footboard 60 may be attached to the guide 166. The turning mechanism 63 capable of turning the footboard 60 on the turning axis AX1 may include the support shaft 168 and the long groove 163. Relative position of the support shaft 168 may be changeable along the long groove 163. The combination of the support shaft 168 and the long groove 163 may be a mechanism for sliding and turning the footboard 60. As described above, the footstool 50 in the storage place 51 may be readily slidable in the Z-axis direction passing the horizontal positions P1 and P2 (FIG. 2A). The footstool 50 in the setup place 52 may be readily slidable in the Z-axis direction passing the horizontal positions P2 and P3 (FIG. 2B).

In switching the footstool 50 from the storage place 51 to the setup place 52, the operator P may open the door and lift the footboard 60 upwards in the horizontal position P1 or P2 (see two-dash line in FIG. 6 lower drawing). The operator P may then turn the footboard 60 backwards on the turning axis AX1 by approximately 90 degrees. The footstool 50 kept mounted on the machine body 10 may be thereby brought from the outside O1 of the machine body to the setup place 52 in the machining area 21 through the opening 22 when the door 25 is open. The operator may switch the leg 70 from the non-use state 72 to the use state 71 to support the footboard 60 by the leg 70. The distal end 70a of the leg 70 or the slip stopper 73 may be received on a rest 118 of the machine body 10. The operator can step on the footboard surface 61 to perform a setup.

Upon completion of the setup, the operator may lift the footboard 60 upwards by approximately 90 degrees on the turning axis AX1 (see two-dash line in FIG. 6 lower drawing) and then downwards. The footstool 50 kept mounted on the machine body 10 can be thereby stored in the retreat 16 on the outside O1 of the machine body. Angling the leg 70 to a non-disturbing position along the footboard 60 will reduce a space in the X-axis direction for the footstool 50 in the storage place. The operator may close the door to launch a next machining. The footstool 50 as shown in FIG. 6 restrains dirt and improves set-up efficiency.

Figure 7:
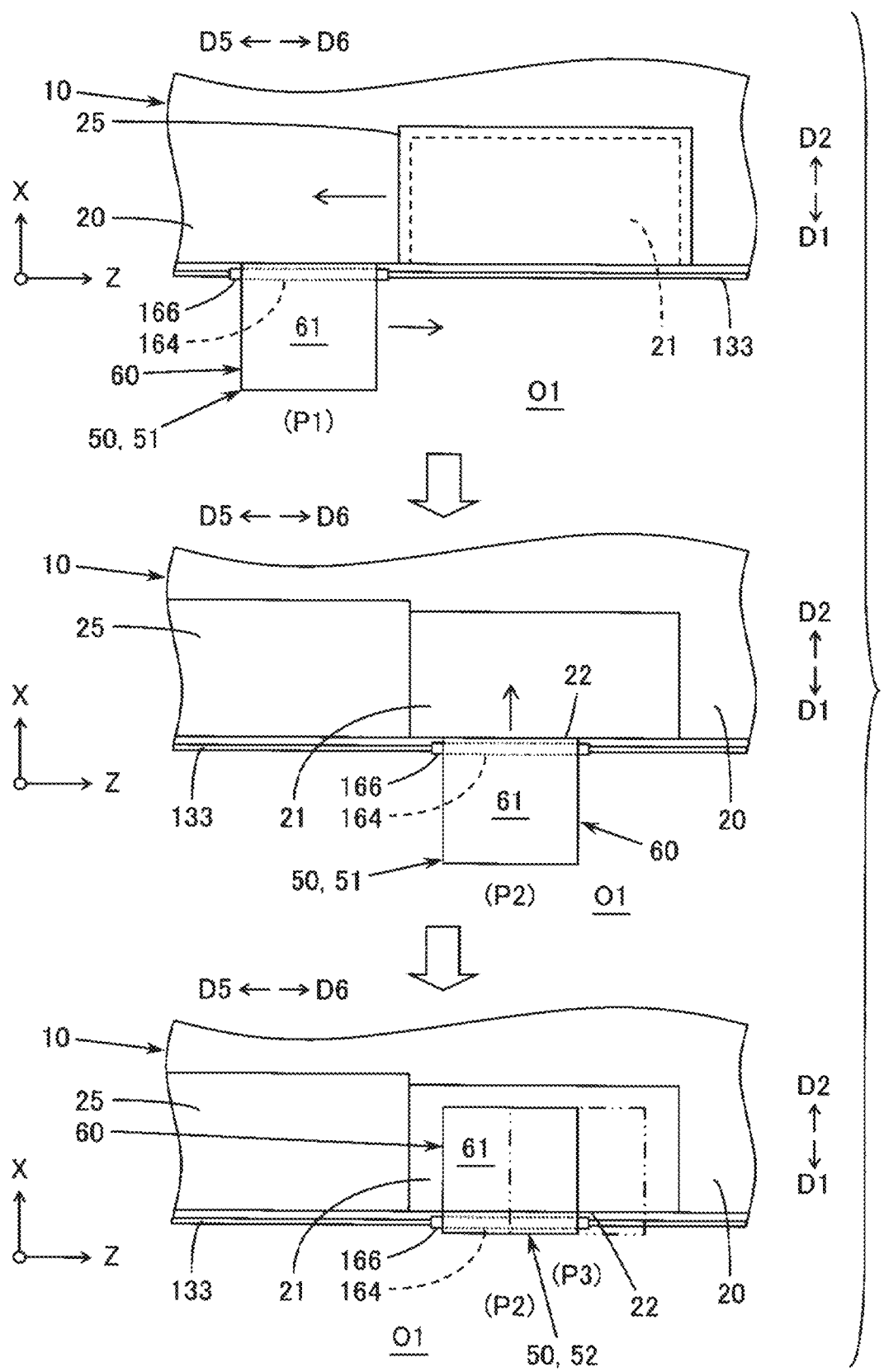
FIG. 7 schematically shows a modified example of the footstool.

As shown in FIG. 7, orientation of the footboard surface 61 may be the same in the storage place 51 and the setup place 52. The upper and middle drawings show the storage place 51 and the lower drawing shows the setup place 52. The machine body 10 may be provided with the rail 133 on the outside O1 to slide the footstool 50 in the 7-axis direction. The footstool 50 may be provided with the guide 166 engaged with the rail 133 slidably in the Z-axis direction. A slide mechanism 164 may be provided on the upper surface of the guide 166 to slide the footboard 60 in the X-axis direction with the footboard surface 61 facing upwards. The footstool 50 in the storage place 51 may readily slide in the Z-axis direction passing the horizontal positions P1 and P2. The footstool 50 in the setup place 52 may readily slide in the Z-axis direction passing the horizontal positions P2 and P3.

In switching the footstool 50 from the storage place 51 to the setup place 52, the operator may open the door and slide the footboard 60 in the horizontal position P1 or P2 rearwards (see upper and middle drawings in FIG. 7). The footstool 50 kept mounted on the machine body 10 may be thereby brought from the outside O1 of the machine body to the setup place 52 in the machining area 21 through the opening 22 when the door 25 is open (see FIG. 7 lower drawing). If a tilt leg is provided, the operator may switch the leg in the non-use state to the use state to support the footboard 60 so that the operator can step on the footboard surface 61.

Upon completion of the setup, the operator may slide the footboard 60 frontwards to retreat the footstool 50 kept mounted on the machine body 10 to the outside O1 as shown in FIG. 7 middle drawing. The operator may further slide the footstool 50 from near the opening 22 (the horizontal position P2, for example) to the non-disturbing position (the horizontal position P1, for example) in the Z-axis direction. The operator may close the door to launch a next machining. The footstool 50 as shown in FIG. 7 restrains dirt and improves set-up efficiency.

If the leg is provided movably in the Z-axis direction, a mechanism for deciding a Z-axis position of the leg may be provided on the machine body. FIG. 8 schematically shows an example of a positioning structure of the footstool 50 slidable in the Z-axis direction. The rest 118 of the machine body 10 may be provided with a plurality positioning spots 119 capable of receiving the distal ends 70a (a slip stopper 73, for example) of the leg 70. The plurality of positioning spots may be arranged in the Z-axis direction. The operator may slide the footstool 50 in the Z-axis direction to locate the distal end 70a of the leg in any of the plurality of positioning spots 119. Engagement of the distal ends 70a with the spot 119 ensures a stop of the footstool 40 in the storage place 51.

(5) CONCLUSION

As described above, the invention provides a lathe capable of restraining dirt and improves set-up efficiency. The essential operations and effects of the invention may be available even from only the elements of independent claim. The elements disclosed in the embodiments may be mutually replaced or the combination thereof may be changed. The disclosed elements may be mutually replaced by prior art of the combination thereof may be changed. Such replacement and change may be within the scope of the invention.

What is claimed is:
1. A machine tool comprising:
a machine body having a splash guard surrounding a machining area, the machine body also having a door capable of closing an opening of the splash guard; and
a footstool kept mounted on the machine body changeably in place with respect to the machine body such that a location of the footstool is able to be changed relative to the machine body while the footstool is mounted on the machine body;
wherein the footstool kept mounted on the machine body is capable of being in a place on an outside of the machine body and splash guard when the door has been closed and wherein the footstool is capable, while remaining mounted on the machine body, of being brought to a setup place inside the machining area from the outside of the machine body through the opening when the door has been opened; and
wherein the footstool comprises a footboard movably attached to the machine body so as to be movable from the place outside of the machine body to the setup place, and
wherein the footstool further comprises a leg that is pivotably mounted to the footboard for pivoting relative to the footboard, wherein the leg is configured to support the footboard when the footboard is in the setup place.

2. The machine tool of claim 1, wherein the footboard comprises a footboard surface where an operator steps when the footstool is held in the setup place, and wherein the footboard surface is in a first orientation when the footboard is in the place outside of the machine body and is in a second, different, orientation when the footboard is in the setup place.

3. The machine tool of claim 2, wherein the footstool is movable in a horizontal direction between different positions when the footstool is held in the place outside the machine body when the door is closed.

4. The machine tool of claim 3, wherein the footstool is movable in a horizontal direction between different positions when the footstool is held in the setup place.

5. The machine tool of claim 4, wherein the footstool further comprises a tilt mechanism configured to facilitate the pivoting of the leg with respect to the footboard,
wherein the tilt mechanism allows the leg to pivot between a use state in which the leg supports the footboard and a non use state in which the leg is angled along the footboard, and
wherein the machine body is provided with a rest capable of receiving an end of the leg when the footstool is held in the setup place and the leg is held in the use state.

6. The machine tool of claim 3, wherein the footstool further comprises a tilt mechanism configured to facilitate the pivoting of the leg with respect to the footboard,
wherein the tilt mechanism allows the leg to pivot between a use state in which the leg supports the footboard and a non use state in which the leg is angled along the footboard, and wherein the machine body is provided with a rest capable of receiving an end of the leg when the footstool is held in the setup place and the leg is held in the use state.

7. The machine tool of claim 2, wherein the footstool is movable in a horizontal direction between different positions when the footstool is held in the setup place.

8. The machine tool of claim 7, wherein the footstool further comprises a footboard mounted on the machine body changeably in place with respect to a tilt mechanism configured to facilitate the pivoting of the leg with respect to the footboard,
wherein the tilt mechanism allows the leg to pivot between a use state in which the leg supports the footboard and a non use state in which the leg is angled along the footboard, and
wherein the machine body is provided with a rest capable of receiving an end of the leg when the footstool is held in the setup place and the leg is held in the use state.

9. The machine tool of claim 2, wherein the footstool further comprises a tilt mechanism configured to facilitate the pivoting of the leg with respect to the footboard,
wherein the tilt mechanism allows the leg to pivot between a use state in which the leg supports the footboard and a non use state in which the leg is angled along the footboard, and
wherein the machine body is provided with a rest capable of receiving an end of the leg when the footstool is held in the setup place and the leg is held in the use state.

10. The machine tool of claim 1, wherein the footstool is movable in a horizontal direction between different positions when the footstool is held in the place outside the machine body when the door is closed.

11. The machine tool of claim 10, wherein the footstool is movable in a horizontal direction between different positions when the footstool is held in the setup place.

12. The machine tool of claim 11, wherein the footstool further comprises a tilt mechanism configured to facilitate the pivoting of the leg with respect to the footboard,
wherein the tilt mechanism allows the leg to pivot between a use state in which the leg supports the footboard and a non use state in which the leg is angled along the footboard, and
wherein the machine body is provided with a rest capable of receiving an end of the leg when the footstool is held in the setup place and the leg is held in the use state.

13. The machine tool of claim 10, wherein the footstool further comprises a tilt mechanism configured to facilitate the pivoting of the leg with respect to the footboard,
wherein the tilt mechanism allows the leg to pivot between a use state in which the leg supports the footboard and a non use state in which the leg is angled along the footboard, and
wherein the machine body is provided with a rest capable of receiving an end of the leg when the footstool is held in the setup place and the leg is held in the use state.

14. The machine tool of claim 1, wherein the footstool is movable in a horizontal direction between different positions when the footstool is held in the setup place.

15. The machine tool of claim 14, wherein the footstool further comprises a tilt mechanism configured to facilitate the pivoting of the leg with respect to the footboard,
wherein the tilt mechanism allows the leg to pivot between a use state in which the leg supports the footboard and a non use state in which the leg is angled along the footboard, and
wherein the machine body is provided with a rest capable of receiving an end of the leg when the footstool is held in the setup place and the leg is held in the use state.

16. The machine tool of claim 1, wherein the footstool further comprises a tilt mechanism configured to facilitate the pivoting of the leg with respect to the footboard,
wherein the tilt mechanism allows the leg to pivot between a use state in which the leg supports the footboard and a non use state in which the leg is angled along the footboard, and
wherein the machine body is provided with a rest capable of receiving an end of the leg when the footstool is held in the setup place and the leg is held in the use state.

17. The machine tool of claim 1, wherein the machine tool is in the form of a lathe.

18. The machine tool of claim 17, wherein the lathe comprises:
a workpiece spindle for holding a workpiece; and
a tool post for supporting machining tools.

19. The machine tool of claim 18, wherein the machining tools include a turning tool and a rotary tool.

20. The machine tool of claim 19, wherein the rotary tool comprises a drill or an end mill.

* * * * *